July 28, 1964  C. I. NIELSEN, JR  3,142,104
MOUNTING FOR CAR TOP CARRIERS
Filed Oct. 2, 1962
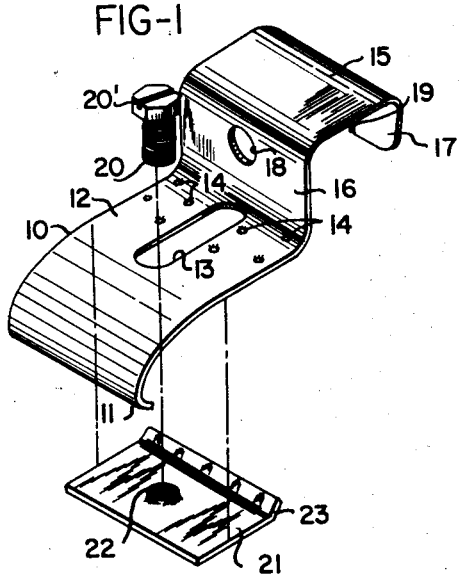
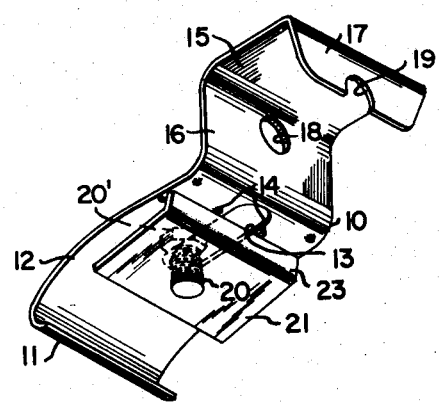
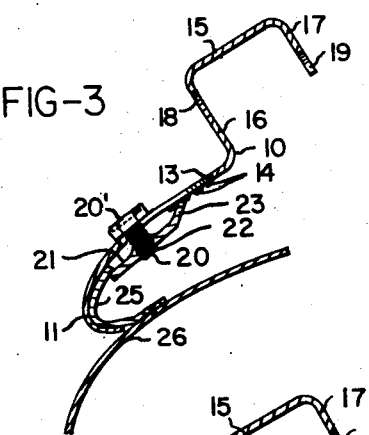
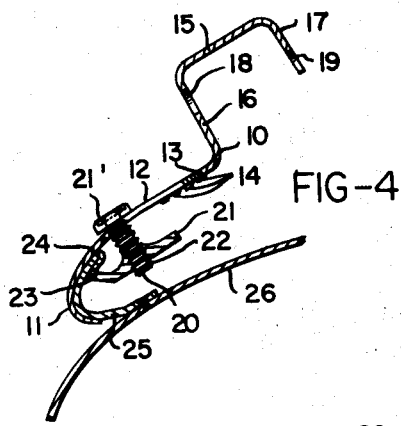
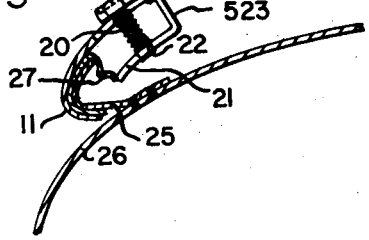
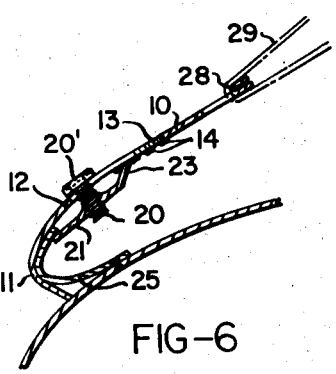
INVENTOR.
C. I. NIELSEN, JR.
BY
Morell & Morell
ATTORNEYS

United States Patent Office 3,142,104
Patented July 28, 1964

3,142,104
MOUNTING FOR CAR TOP CARRIERS
Chester I. Nielsen, Jr., West Bend, Wis., assignor to Wesbar Stamping Corporation, West Bend, Wis., a corporation of Wisconsin
Filed Oct. 2, 1962, Ser. No. 227,739
1 Claim. (Cl. 24—263)

This invention relates to an improved mounting clamp for car top carriers.

So-called car top carriers are commonly utilized on cars for carrying luggage, skis, or other objects too bulky or unwieldy to be stored in the car, such carriers being mounted on the car roof and secured to and between the rain gutters or troughs which are formed on and extend along the sides of said roof. In mounting such a carrier, brackets on the ends of carrier straps are normally hooked on the rain gutter on one side of the car and the carrier straps on the opposite side of the car top are hooked onto the opposite rain gutter, the tension of said straps functioning to maintain the brackets in engagement with said gutters. Unfortunately, however, it has been found that this conventional mounting arrangement is unsatisfactory for the reason that the carrier straps tend to stretch due to the constant tension thereon, with the result that the brackets become loose and eventually disengage themselves. This is not only inconvenient and annoying, but can be extremely dangerous.

With the above in mind, the general object of the present invention is to provide an improved mounting bracket for car top carriers and the like which is adapted to clampingly engage the rain gutter of an automobile independently of the tension provided by the carrier straps or struts, thus providing greater reliability and safety than is obtained with conventional car top carrier mounting devices.

A further object is to provide an improved retaining clamp device for car top carriers and the like which is not only more reliable than the bracket hooks in present use, but which device simplifies and facilitates the assembly and mounting of the carrier on the top of a car.

A further object of the present invention is to provide a novel mounting clamp for car top carriers and the like which can be readily installed on automobiles of various makes and styles.

Still further objects of the present invention are to provide an improved mounting clamp for car top carriers and the like which is strong and durable, which is relatively inexpensive to manufacture, and which improved clamp structure is otherwise particularly well adapted for its intended purposes.

With the above and other objects in view, which other objects and advantages of the present invention will become apparent hereinafter, the invention consists of the improved mounting clamp for car top carriers and the like, and all of its parts and combinations, as set forth in the claim, and all equivalents thereof.

In the accompanying drawing, wherein there is shown the preferred form of the invention and several modifications thereof:

FIG. 1 is an exploded perspective view of the improved clamp comprising the present invention;

FIG. 2 is a perspective view looking at the under side of the assembled clamp;

FIG. 3 is a longitudinal sectional view showing the clamp mounted on the rain gutter of an automobile;

FIG. 4 is a sectional view showing a modified arrangement of the invention;

FIG. 5 is a sectional view of a modification of the principal clamp structure; and FIG. 6 is a sectional view of still another modified form of the present invention.

Referring now more particularly to FIGS. 1, 2 and 3 of the drawing, it will be seen that the improved mounting clamp for car top carriers comprising the present invention includes an elongated hook member 10 which can be inexpensively stamped from a flat piece of stainless steel or the like. Said hook member has an inturned, curved lip 11 on its lower end which is adapted to fit closely around and under the generally U-shaped or J-shaped rain gutter or trough 25 which is welded or otherwise secured to the roof 26 of a typical automobile (FIG. 3). Said rain gutters are ordinarily positioned at the approximate junction of the car roof and body, and extend longitudinally on both sides of the car.

The integral central portion 12 of said hook member 10 is generally flat, being designed to extend upwardly at an angle, as shown. Said hook member central portion has a longitudinal slot 13 therethrough, and punched or otherwise formed in its under surface are a plurality of protrusions 14, the function of which will be seen. In the principal form of the invention the upper portion 15 of said hook member has a double right-angular bend providing spaced, transverse legs 16 and 17, as shown, and formed therein is an aligned aperture 18 and slot 19 through which a bolt or the like fixed on the end of the carrier strap may be projected and secured. The particular manner of attaching the carrier strap or strut to the present clamp unit is not critical, however, and the invention is not to be limited in this respect.

Projected through the slotted opening 13 in the central portion of the hook member is a threaded bolt 20, the enlarged head 20' thereon abutting the outer surface of said hook member, and threaded onto the shank of said bolt 20 is a flat, clamping plate 21 having a threaded central aperture 22 therethrough, said plate preferably being an inexpensive stamping. In the form of the invention illustrated in FIGS. 1 to 3, said clamping plate has an upper edge portion, or leg 23 deflected upwardly at an obtuse angle, as shown.

In the use of the principal form of mounting device comprising the present invention, and with particular reference now to FIG. 3 of the drawing, the hook member 10 is first positioned with its lip 11 engaged around the car rain gutter 25, and the bolt 20 is turned to draw the plate 21 upwardly to a position where its lower edge engages against the inner surface of said gutter, as shown. Said bolt 20 may be shifted longitudinally in the slot 13 if necessary to so position said plate, and is turned to tighten said plate firmly against the gutter and to thereby effectively clamp the hook member thereon. With the plate design illustrated in FIGS. 1 to 3, when the unit is thus mounted on the car gutter the upturned edge portion or leg 23 on the clamping plate is adapted to engage against sets of the aforementioned protrusions 14 on the underside of the hook member, thus preventing longitudinal movement of the bolt and plate and eliminating the possibility of said mounting clamp working loose.

With a pair of the novel clamps hereinabove described, a car top carrier is secured to and between the rain gutters on the car, as with conventional mounting hooks, but with the present mounting arrangement it is unnecessary to maintain said members in position by means of tension on the carrier straps or struts, as is required with conventional car top carriers. The result is a novel carrier mounting arrangement which is not only quicker and simpler than the conventional method, but which is much more effective and reliable.

In FIGS. 4, 5 and 6 there are shown several modified forms of the present invention. Referring first to the arrangement illustrated in FIG. 4, it will be seen that the illustrated rain gutter 25 has an inturned flange or lip 24 thereon, such as is provided on some makes of cars. With this type of gutter it has been found that by rotating the clamping plate 180° to the position shown, the leg 23 thereon fits under and bears against the underside of said gutter flange 24 to provide a coaction which prevents the inadvertent disengagement of said members.

In FIG. 5 there is shown a modified clamp structure especially designed for a rain gutter having a strip of stainless steel trim 27 thereon, such as is provided on one make of car. As will be seen, said trim has a unique curlycue cross-sectional form and depending edge portion, and to accommodate such an odd-shaped gutter the clamping plate includes an upwardly-deflected leg 523 which is bent at a right angle to said plate, and which leg is substantially longer than the leg 23 characterizing the principal form of the invention. Through this modified plate design, it is possible to clampingly engage the extended lower edge of the gutter trim 27, as illustrated, and to thereby obtain an effective clamping arrangement.

The structure illustrated in FIG. 6 is identical to the clamp characterizing the principal form of the invention, and hereinabove described, with the exception that the upper end portion 13 of the hook member is not deflected at right angles to provide the spaced strap-receiving legs 16 and 17 of FIGS. 1 to 5. In this simplified clamp design, a slot 28 is provided adjacent the upper end of the hook member, and the carrier strap 29 is merely inserted therethrough and suitably anchored. The purpose of the disclosure in FIG. 6, as well as the designs featured in FIGS. 4 and 5, is to illustrate some of the many possible structural modifications which can be incorporated in the present invention without departing from the spirit of the invention.

From the foregoing detailed description, it will be seen that the present invention provides a unique and improved retaining clamp for securing an end of a car top carrier to one of the rain gutters of a car. Heretofore, it has been the practice to engage a hook under one gutter on one side of the car top and to engage an opposite hook under the opposite gutter, the strap tension providing the sole means of maintaining said hooks in position. As mentioned, such an arrangement is unsatisfactory for the reason that the straps tend to stretch due to the tension thereon, with the result that said hooks ultimately work themselves loose. With the present structure, on the other hand, each clamp is independently mounted on its rain gutter and cannot work itself loose regardless of the condition of the carrier straps or struts. Moreover, the present clamp is simple to install and facilitates the mounting of the carrier on the top of a car.

It is to be understood, of course, that the present invention is not to be limited or confined to a clamp design identical to the examples illustrated and hereinabove described. It is contemplated that various further modifications or changes might be made therein while retaining the novel concept characterizing the present invention. In short, it is intended to include herein not only the illustrated forms of the present invention, but also any and all modifications or variations thereof as may come within the spirit of said invention and within the scope of the following claim.

What I claim is:

A mounting device for securing an end of a car top carrier to one of the rain gutters of a car, comprising an elongated hook member having one end portion provided with means for attachment to a portion of a car top carrier and having a gutter lip at its opposite end shaped to embrace the exterior of the rain gutter on a car, said hook member having a slotted opening intermediate its length, a plurality of longitudinally-spaced downwardly-projecting protrusions from the undersurface of said hook member alongside of said slot, a clamping plate having one end flanged upwardly to provide an edge and having its other end adapted to engage the gutter in a position to clamp the gutter between said gutter lip and plate, and means including a bolt extending through the slot of the hook member for effecting said clamping action, the edge of the flanged end of the plate being positioned to engage selected protrusions whereby longitudinal movement of the plate relative to the hook member is positively prevented.

References Cited in the file of this patent

UNITED STATES PATENTS

| | | |
|---|---|---|
| 759,560 | Sharp | May 10, 1904 |
| 2,141,818 | McNamara | Dec. 27, 1938 |
| 2,514,266 | Walslager | July 4, 1950 |
| 2,603,394 | Beck | July 15, 1952 |
| 2,771,231 | Hare | Nov. 20, 1956 |
| 2,848,148 | Kutz | Aug. 19, 1958 |

FOREIGN PATENTS

| | | |
|---|---|---|
| 805,766 | Great Britain | Dec. 10, 1958 |
| 1,241,253 | France | Aug. 8, 1960 |